US011982645B2

(12) United States Patent
Iannotti et al.

(10) Patent No.: US 11,982,645 B2
(45) Date of Patent: *May 14, 2024

(54) SENSOR SYSTEM AND METHOD (71) Applicant: General Electric Company, Schenectady, NY (US)

(72) Inventors: Joseph Alfred Iannotti, Glenville, NY (US); Christopher James Kapusta, Delanson, NY (US); David Richard Esler, Gloversville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,788

(22) Filed: Apr. 14, 2023

(65) Prior Publication Data

US 2023/0273160 A1 Aug. 31, 2023

Related U.S. Application Data

(63) Continuation of application No. 17/362,407, filed on Jun. 29, 2021, now Pat. No. 11,630,086, which is a
(Continued)

(51) Int. Cl.
*G01N 29/22* (2006.01)
*G01D 11/24* (2006.01)
(Continued)

(52) U.S. Cl.
CPC ......... *G01N 29/223* (2013.01); *G01D 11/245* (2013.01); *G01K 11/265* (2013.01); *G01N 29/2443* (2013.01); *G01N 29/2462* (2013.01)

(58) Field of Classification Search
CPC .... G01N 29/223; G01N 29/041; G01N 29/14; G01N 29/2462; G01N 29/2475;
(Continued)

(56) References Cited

U.S. PATENT DOCUMENTS 5,102,029 A 4/1992 Richardson et al.
5,459,368 A 10/1995 Onishi et al.
(Continued)

FOREIGN PATENT DOCUMENTS

CN 102175358 A 9/2011
CN 103924204 B 12/2015
(Continued)

OTHER PUBLICATIONS

Feiertag et al., "Surface acoustic wave component packaging", ResearchGate, Jan. 2007.
(Continued)

*Primary Examiner* — Suman K Nath
(74) *Attorney, Agent, or Firm* — Dinsmore & Shohl LLP (57) ABSTRACT

A system includes a sensor comprising a sensor bonding layer disposed on a surface of the sensor, wherein the sensor bonding layer is a metallic alloy. An inlay includes a planar outer surface, wherein the inlay may be disposed on a curved surface of a structure. A structure bonding layer may be disposed on the planar outer surface of the inlay, wherein the structure bonding layer is a metallic alloy. The sensor bonding layer is coupled to the structure bonding layer via a metallic joint, and the sensor is configured to sense data of the structure through the metallic joint, the structure bonding layer, and the sensor bonding layer. The inlay comprises at least one of a modulus of elasticity, a shape, a thickness, and a size configured to reduce strain transmitted to the sensor.

20 Claims, 4 Drawing Sheets

Related U.S. Application Data continuation of application No. 16/720,471, filed on Dec. 19, 2019, now Pat. No. 11,079,359, which is a continuation-in-part of application No. 15/616,105, filed on Jun. 7, 2017, now Pat. No. 10,605,785.

(51) Int. Cl.
    *G01K 11/26*     (2006.01)
    *G01N 29/24*     (2006.01)

(58) Field of Classification Search
CPC .. G01N 29/2481; G01K 11/265; G01L 1/165; G01L 3/00
See application file for complete search history.

(56) References Cited

U.S. PATENT DOCUMENTS

| | | |
|---|---|---|
| 6,532,833 B1 | 3/2003 | Lec |
| 6,853,067 B1 | 2/2005 | Cohn et al. |
| 7,239,068 B2 | 7/2007 | Miyaji |
| 7,605,466 B2 | 10/2009 | Aimi et al. |
| 9,543,736 B1 | 1/2017 | Barwicz et al. |
| 10,432,168 B2 | 10/2019 | Kapusta et al. |
| 11,369,272 B1* | 6/2022 | Davis ................ H01P 3/123 |
| 11,619,613 B1* | 4/2023 | Davis ................ G01N 29/2431 |
| | | 73/643 |
| 2007/0046142 A1 | 3/2007 | Obara et al. |
| 2007/0105341 A1 | 5/2007 | Sosnowchik et al. |
| 2007/0188054 A1 | 8/2007 | Hasken et al. |
| 2010/0132404 A1 | 6/2010 | Shuja |
| 2012/0078313 A1 | 3/2012 | Hasse et al. |
| 2013/0044322 A1 | 2/2013 | Feitisch et al. |
| 2014/0375169 A1 | 12/2014 | Na et al. |
| 2015/0185247 A1 | 7/2015 | Eid et al. |
| 2015/0264808 A1 | 9/2015 | Bretschneider |
| 2015/0373964 A1 | 12/2015 | Gaag et al. |
| 2016/0181202 A1 | 6/2016 | Gong et al. |
| 2016/0268190 A1 | 9/2016 | McKnight-Macneil et al. |
| 2016/0282204 A1 | 9/2016 | Haines et al. |
| 2017/0063326 A1 | 3/2017 | Kapusta et al. |
| 2019/0119103 A1 | 4/2019 | Guilardi |

FOREIGN PATENT DOCUMENTS

| | | |
|---|---|---|
| DE | 198 56 951 A1 | 10/1999 |
| EP | 3415888 A1 | 6/2018 |
| WO | 2001067058 A1 | 9/2001 |
| WO | 2019069620 A1 | 4/2019 |

OTHER PUBLICATIONS

"NanoFoil", Indium Corporation, http://www.indium.com/nanofoil/, Retrieved on Mar. 22, 2017.

Extended European Search Report and Opinion issued in connection with corresponding EP Application No. 18175715.4 dated Nov. 15, 2018.

European Extended Search Report for EP Application No. 20213170.2 dated May 11, 2021 (21 pages).

* cited by examiner

SENSOR SYSTEM AND METHOD

CROSS-REFERENCE TO RELATED APPLICATIONS

The present specification is a continuation of U.S. patent application Ser. No. 17/362,407, filed Jun. 29, 2021, which is a continuation of U.S. patent application Ser. No. 16/720,471, filed Dec. 19, 2019 (now U.S. Pat. No. 11,079,359), which itself is a continuation-in-part of U.S. patent application Ser. No. 15/616,105, filed Jun. 7, 2017 (now U.S. Pat. No. 10,605,785), each of which is incorporated by reference herein.

FIELD

The subject matter described herein relates to sensors.

BACKGROUND

Sensors may be used in a variety of applications. For example, in electro-mechanical systems, surface acoustic wave (SAW) devices may be used as sensors to measure torque, temperature, pressure, and other parameters. The SAW devices may be wafer level hermetically capped or placed and sealed inside of hermetic discrete packages, and then mounted onto structures in order to sense data of the structure. The SAW devices may be mounted onto structures such as shafts, rods, blades, or alternative structures used in various applications such as aviation, oil and gas, transportation, renewable energy extraction, or the like.

The processes of mounting sensors to structures presently include several issues. One issue present with mounting sensors to certain structures is that many structures are too large to fit into conventional ovens or reflow equipment or may not be able to be transported to a location having conventional ovens or reflow equipment to mount the sensors to the structure. Therefore, many SAW devices are mounted to structures using an adhesive or epoxy material. However, using an epoxy or adhesive to mount a sensor to a structure limits the operating temperature of the system, reduces the sensitivity of the sensor to sense data of the structure, limits the capability of future re-workability of the sensors mounted to the structures, and requires significant time for the epoxy or adhesive to properly cure, which increases associated manufacturing and material costs. It is advantageous to have a more robust mounting method to attach these sensors both in the field and in a production setting.

BRIEF DESCRIPTION

In one embodiment, a system includes a structure bonding layer and a sensor. The structure bonding layer is disposed on a structure. The structure bonding layer is a metallic alloy. The sensor includes a non-metallic wafer and a sensor bonding layer disposed on a surface of the non-metallic wafer. The sensor bonding layer is a metallic alloy. The sensor bonding layer is coupled to the structure bonding layer via a metallic joint, and the sensor is configured to sense data of the structure through the metallic joint, the structure bonding layer, and the sensor bonding layer.

In one embodiment, a method includes disposing a structure bonding layer on a structure. The structure bonding layer is a metallic alloy. The method includes disposing a sensor bonding layer on a surface of a non-metallic wafer of a sensor. The sensor bonding layer is a metallic alloy. The method also includes coupling the structure bonding layer to the sensor bonding layer via a metallic joint. The sensor is configured to sense data of the structure through the metallic joint, the structure bonding layer, and the sensor bonding layer.

In one embodiment, a system includes a sensor, an inlay, and a structure bonding layer. The sensor includes a sensor bonding layer disposed on a surface of the sensor. The sensor bonding layer is a metallic alloy. The inlay is disposed on a curved surface of a structure. The inlay includes a planar outer surface. The structure bonding layer is disposed on the planar outer surface of the inlay. The structure bonding layer is a metallic alloy. The sensor bonding layer is coupled to the structure bonding layer via a metallic joint, and the sensor is configured to sense data of the structure through the metallic joint, the structure bonding layer, and the sensor bonding layer.

BRIEF DESCRIPTION OF THE DRAWINGS

The inventive subject matter will be better understood from reading the following description of non-limiting embodiments, with reference to the attached drawings, wherein below.

DETAILED DESCRIPTION

One or more embodiments of the inventive subject matter described herein provide systems and methods having a sensor that is disposed on a structure via a metallic sensor bonding layer and a metallic structure bonding layer joined to a metallic joint in order to sense data of the structure through the metallic joint, the sensor bonding layer, and the structure bonding layer. The structure may be a large structure such as a rod, a shaft, a blade, or the like, used in applications such as aviation, oil and gas, transportation, renewable energy extraction, power and energy systems, or the like. The sensor may sense temperature data, strain data, stress data, and/or the like of the structure. For example, the sensor may sense temperature data of a conduit that transfers oil, may sense the temperature of the oil that is transferred inside of the conduit, may sense the strain of a rotating shaft, or the like. The systems and methods described herein may improve sensor sensitivity, enable exposure of systems to higher operating temperatures, and reduce an amount of creep of the bonding materials relative to systems that do not have a metallic bond.

Figure 1:
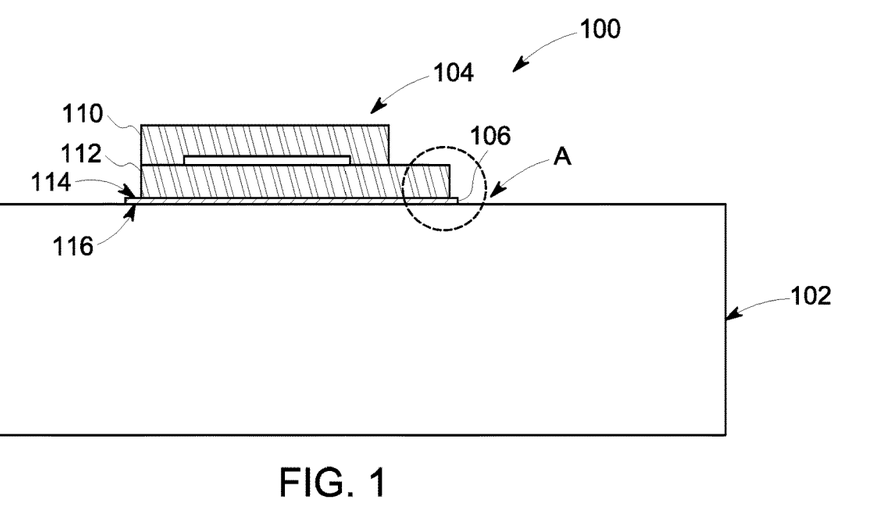
FIG. 1 illustrates a cross-sectional view of a system in accordance with one embodiment.

FIG. 1 illustrates a cross-sectional view of a system 100 in accordance with one embodiment. The system 100 includes a sensor 104 that is coupled to a structure 102. The structure 102 may be a shaft, a plate, a blade, a rod, or the like. The structure 102 may be a manufactured out of a metallic and/or non-metallic material. For example, the structure 102 may be a shaft used to transfer oil or gas, may be a rotor blade of a wind turbine, may be a rotating or stationary shaft of an aerial device, or the like. Optionally, the structure 102 may be any alternative component used in applications such as aviation, oil and gas, transportation, renewable energy extraction, power and energy systems, or the like.

The sensor 104 has a first component 110 that is bonded to a second component 112. The first and second components 110, 112 of the sensor 104 may be single crystal quartz wafers that are coupled together by a liquid crystal polymer (LCP) material. Optionally, the sensor 104 may have more than two or less than two components. Optionally, the components of the sensor 104 may be held together by any alternative material. The sensor 104 is used to sense data. For example, the sensor 104 may be a SAW device that includes a strain gauge, torque sensor, temperature sensor, and/or the like, that is used to sense temperature data, strain data, stress data, and/or the like of the structure 102. Optionally, the sensor 104 may be an alternative sensor that senses (e.g., records, collects, reads, measures, or the like) information about the structure 102.

The sensor 104 is coupled to a first side 114 of a metallic joint 106 of the system 100. Additionally, the structure 102 is coupled to an opposite, second side 116 of the metallic joint 106. The sensor 104 is operably coupled to the structure 102 via the metallic joint 106 in order to sense data of the structure. In the illustrated embodiment of FIG. 1, a surface of the sensor 104 that is coupled to the first side 114 of the metallic joint 106 and a surface of the structure 102 that is coupled to the second side 116 of the metallic joint 106 are planar or substantially planar surfaces (within manufacturing tolerances). Optionally, one or more of the sensor 104 or the structure 102 may have non-planar surfaces that are coupled to the metallic joint 106. For example, the structure 102 may be a shaft that has a cross-sectional shape that is generally circular and the sensor 104 is operably coupled to the circular cross-sectional shape of the outer surface of the shaft structure 102. Optionally, the structure 102 may be a blade with a curved outer surface and the sensor 104 is operably coupled to the curved outer surface of the blade structure 102.

In one embodiment, the system 100 includes a structure 102 having multiple sensors 104 that are operably coupled with the structure 102 via a metallic joint 106. For example, the multiple sensors 104 may be arranged as an array of multiple sensors 104 in columns and rows or may be randomly arranged and coupled with one or more surfaces of the structure 102. Optionally, the system 100 may have one or more metallic joints 106 that couple the sensors 104 with the structure 102. For example, a single metallic joint 106 may couple multiple sensors 104 with the structure 102, multiple metallic joints 106 may couple the multiple sensors 104 with the structure 102, or the like.

Figure 2:
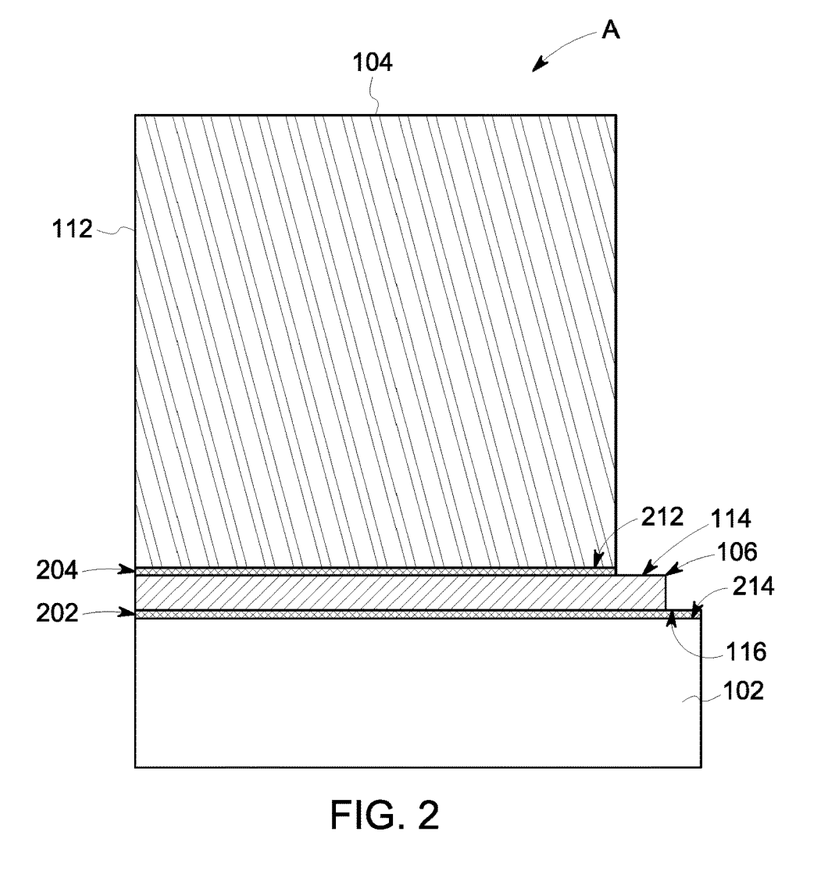
FIG. 2 illustrates a partial cross-sectional view of the system of FIG. 1 in accordance with one embodiment.

FIG. 2 illustrates a partial cross-sectional view A of the system 100 of FIG. 1 including the sensor 104 that is made of a quartz/non-metallic material in accordance with one embodiment. The sensor 104 has a sensor bonding layer 204 that is disposed on a surface 212 of the sensor 104. The sensor bonding layer 204 is a metallic alloy that can be coupled to the metallic joint 106. The sensor bonding layer 204 is a solderable and/or braze-able finish. The layer 204 can be deposited by sputtering, plating, or other application techniques. For example, the sensor bonding layer 204 may represent or include titanium, copper, silver, tin, nickel, gold, electroless nickel immersion gold (eNIG), and/or the like, that is disposed on the surface 212 of the sensor 104. In a non-limiting example, the sensor bonding layer 204 is a stack defined by individual layers of titanium, nickel, and gold. For example, the thicknesses of the layers may be about 1.2 micrometers nickel, about 1500 A gold, and about 1000 A titanium. The modifier "about" indicates that the values are inclusive of other values above and below the indicated values within a threshold range, such as ±1%, 2%, 3%, or the like of the indicated values. Alternatively, the sensor bonding layer 204 may be a different metallic compound and/or metal alloy that may be bonded to the metallic joint 106 and that provides adhesion between the sensor 104 and the structure 102. The sensor bonding layer 204 may have a higher operating temperature and a higher modulus of elasticity relative to an epoxy, adhesive, liquid crystal polymer, or the like. In an alternative embodiment, the sensor 104 may be manufactured of a metallic material that is coupled directly to the metallic joint 106 such that the system 100 is devoid of the sensor bonding layer 204.

The structure 102 has a structure bonding layer 202 that is disposed on a surface 214 of the structure 102. In one embodiment, the surface 214 may be an outer, or exterior surface of the structure 102 that is metallic and allows for metallic bonding between the structure and the metallic joint 106. Optionally, the surface 214 may be an interior surface of a structure 102. For example, the sensor 104 may be bonded to the interior of the structure 102 (e.g., the interior of a hollow shaft, or the like) and the structure bonding layer 202 may be disposed on an interior surface 214 of the structure 102.

The structure bonding layer 202 is a metallic compound and/or metallic alloy that can be coupled (e.g., bonded) to the metallic joint 106. The structure bonding layer 202 is a layer of a material suitable for metallic bonding that is disposed on the surface 214 of the structure 102. In one or more embodiments, the structure bonding layer 202 may be a local metallization of the surface 214 of the structure 102. In a non-limiting example, the structure bonding layer 202 may be an inlay, such as a copper inlay, along the surface 214 of the structure 102, as described below with reference to FIG. 6. The structure 102 may or may not be manufactured out of a material that is directly solderable to the second side 116 of the metallic joint 106. For example, the structure 102 may be manufactured out of a steel alloy that is solderable to the metallic joint 106 or may be manufacturing out of brass or another non-steel alloys that is not solderable to the metallic joint 106. The structure bonding layer 202 may be a metallic alloy that has a higher operating temperature and a higher modulus of elasticity relative to an epoxy, adhesive, liquid crystal polymer, or the like. In a non-limiting example, the structure bonding layer 202 may be electroless nickel immersion gold (eNIG), electrolytic nickel gold (NiAu), or the like, when there cannot be a direct metallic bond between a non-metallic structure 102 and the sensor 104, or when the structure 102 and/or the sensor 104 are made of materials that are not applicable for metallic bonding and/or wetting.

The metallic joint 106 is a metallic bond that operably couples the sensor 104 with the structure 102. Non-limiting examples of the material of the metallic joint 106 include solder alloys composed of tin, silver, copper, gold, lead, germanium, and/or indium. Some non-limiting examples (by percent weight) of specific compositions include 96.5% tin—3% silver—0.5% copper; 80% gold—20% tin; 92.5% lead—5% tin—2.5% silver; 88% gold—12% germanium; or 82% gold—18% indium. Active solders with titanium, magnesium, and/or rare earth elements may be used as the metallic joint 106. Alternatively, the metallic joint 106 may include different materials and/or alloys, such as transient liquid phase sintering, sintered silver, sintered copper, sintered nickel, braze alloys, and/or the like.

The conditions in the field, such as temperature, humidity, pressure, and the like, may vary and may deviate from preferred conditions for bonding. Conventional electronic soldering operations may utilize non-metal flux chemicals that are mixed into the solder alloy, and the resulting solder mixture is heated with specific ramp rates to match the chemical flux activation/oxide removal reaction. In very large assemblies the process window may be too long for conventional fluxes to work (e.g., the fluxes may dry out during an exceedingly long ramp to temperature). In one or more embodiments, the active elements in the metallic joint 106 can aid in solder joint formation, replacing or at least supporting the conventional non-metal flux chemicals.

The sensor bonding layer 204 is coupled to the first side 114 of the metallic joint 106, and the structure bonding layer 202 is coupled to the second side 116 of the metallic joint 106 in order to operably couple the sensor 104 with the structure 102. The sensor 104 senses data of the structure 102 through the metallic joint 106, the sensor bonding layer 204 and the structure bonding layer 202. The sensor 104 may sense temperature, strain, stress, pressure, or the like, of the structure 102. For example, a torque may be applied to the structure 102. The sensor 104 may measure the stress or strain on the structure 102 that is transferred through the structure bonding layer 202, the metallic joint 106, and the sensor bonding layer 204 to the sensor 104.

In one embodiment, the modulus of elasticity of the material of the sensor bonding layer 204 and the modulus of elasticity of the material of the structure bonding layer 202 impacts the amount of strain data that is transferred from the structure 102 through the structure bonding layer 202, the metallic joint 106, and the sensor bonding layer 204 to the sensor 104. For example, as the modulus of elasticity of the material of the sensor and structure bonding layers 204, 202 increases (e.g., the materials become stiffer), the accuracy of the sensor 104 measuring strain data of the structure increases. Alternatively, as the modulus of elasticity of the material of the sensor and structure bonding layers 204, 202 decreases (e.g., the materials become less stiff), the accuracy of the sensor 104 measuring strain data of the structure decreases. For example, the sensor 104 that is operably coupled with the structure 102 via the metallic joint 106 is more accurate relative to the sensor 104 that is operably coupled with the structure 102 via an adhesive and/or epoxy material. Additionally, the sensor 104 that is operably coupled with the structure 102 via the metallic joint 106 may be used in systems having higher operating temperatures relative to the sensor 104 that is operably coupled with the structure 102 via an adhesive and/or epoxy material. Additionally, the sensor 104 that is operably coupled with the structure 102 via the metallic joint 106 may have less creep of the metallic joint than the sensor 104 that is operably coupled with the structure 102 via an adhesive and/or epoxy. To achieve acceptable strain transfer from the structure 102 to the sensor 104, the modulus of elasticity in the bonding layers 204, 202 may have a minimum value of 700 MPa. In order to increase accuracy of the strain data that is transferred to the sensor 104, it is advantageous to have a modulus of elasticity above 2000 MPa. Additionally, the modulus of elasticity at varying temperatures may impact the accuracy of the strain data that is transferred to the sensor 104. Non-limiting examples of metals, metal alloys, and/or metallic materials disclosed have sufficient modulus of elasticity at high temperatures. For example, in conventional epoxy materials, the modulus decreases at temperatures greater than 150° C. Alternatively, metals and/or metal alloys can be used between 40% to 75% of the homologous temperature with minimal creep. In the alloys listed, the homologous temperature may have a temperature greater than 1000° C.

Figure 3:
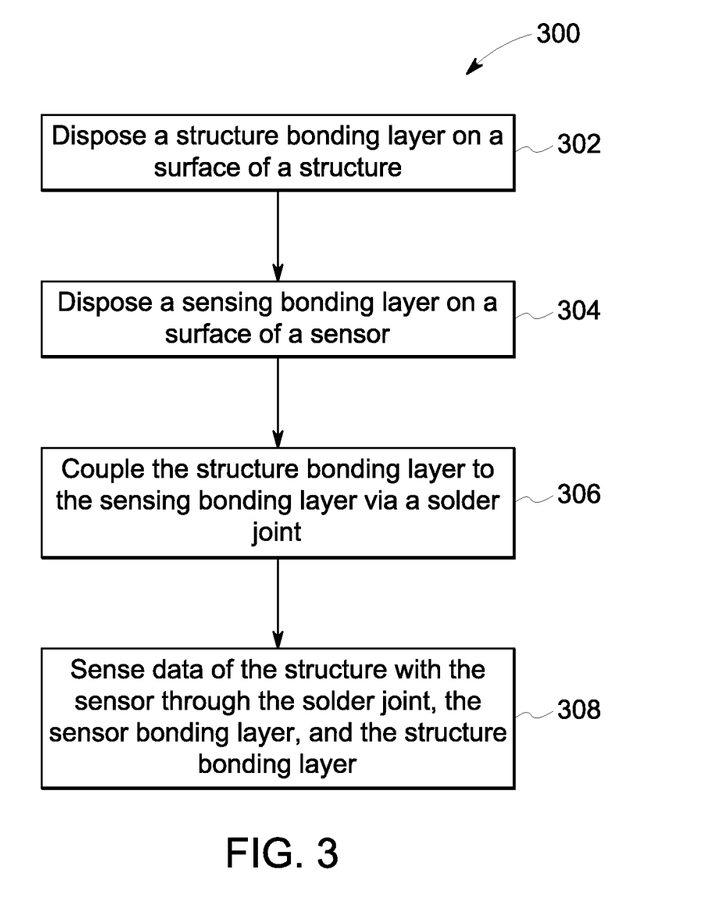
FIG. 3 illustrates a method flowchart in accordance with one embodiment.

FIG. 3 illustrates a method flowchart 300 of the system 100 in accordance with one embodiment. At 302, a structure bonding layer 202 is disposed on a surface 214 of a structure 102. For example, the structure bonding layer 202 may be a local metallization of the surface 214 of the structure 102, or the structure bonding layer 202 may be a layer of a solderable material that is disposed on the surface 214 of the structure 102. The structure bonding layer 202 may have a surface area on the surface 214 of the structure 102 that is substantially equivalent to a surface area of the surface 212 of the sensor 104. Optionally, the structure bonding layer 202 may have a surface area that is greater than or less than the surface area of the surface 212 of the sensor 104. Optionally, the structure bonding layer 202 may have a surface area that is substantially the same as the surface area of the metallic joint 106, may have a surface area that is less than the surface area of the metallic joint 106, or may have a surface area that is greater than the surface area of the metallic joint 106.

At 304, a sensor bonding layer 204 is disposed on a surface 212 of a sensor 104. For example, the sensor bonding layer 204 may be a layer of a metallic material. The structure bonding layer 202 and the sensor bonding layer 204 may be common or unique metallic alloys. The sensor bonding layer 204 may have a surface area that is substantially equivalent to a surface area of the surface 212 of the sensor 104, may have a surface area that is less than the surface area of the surface 212, or may have a surface area that is greater than the surface area of the surface 212. Optionally, the sensor bonding layer 204 may extend an area that is substantially equivalent to, is less then, or is greater than the surface area of the metallic joint 106.

In one or more embodiments, the sensor bonding layer 204 and/or the structure bonding layer 202 use self-orientation or self-alignment to assemble the sensor 104 to the structure 102 via the metallic joint 106. The metallic joint 106 may be a solder layer made of a solder alloy having wetting properties that enables the sensor bonding layer 204 of the sensor 104 to self-align with the structure bonding layer 202 of the structure 102 when the sensor 104 is bonded to the structure 102. For example, the metallic joint 106 allows the sensor 104 to self-align with the structure 102 without the use of additional pick-and-place equipment, additional fixture equipment, or the like.

At 306, the structure bonding layer 202 is coupled to the sensor bonding layer 204 via the metallic joint 106. For example, the sensor bonding layer 204 is coupled with a first side 114 of the metallic joint 106, and the structure bonding layer 202 is coupled with an opposite, second side 116 of the metallic joint 106.

The sensor 104 is operably coupled with the structure 102 via the metallic joint 106 at a location outside of a conventional reflow oven. For example, the structure 102 may be part of an assembly that may not be able to be transferred to a reflow oven, the structure 102 may not be able to be disassembled from the assembly to be transferred to a reflow oven, the structure 102 may not be able to fit inside of a reflow oven, the structure 102 may be manufacture out of a material that cannot withstand conventional operating temperatures of a conventional reflow oven, or the like.

Figure 4:
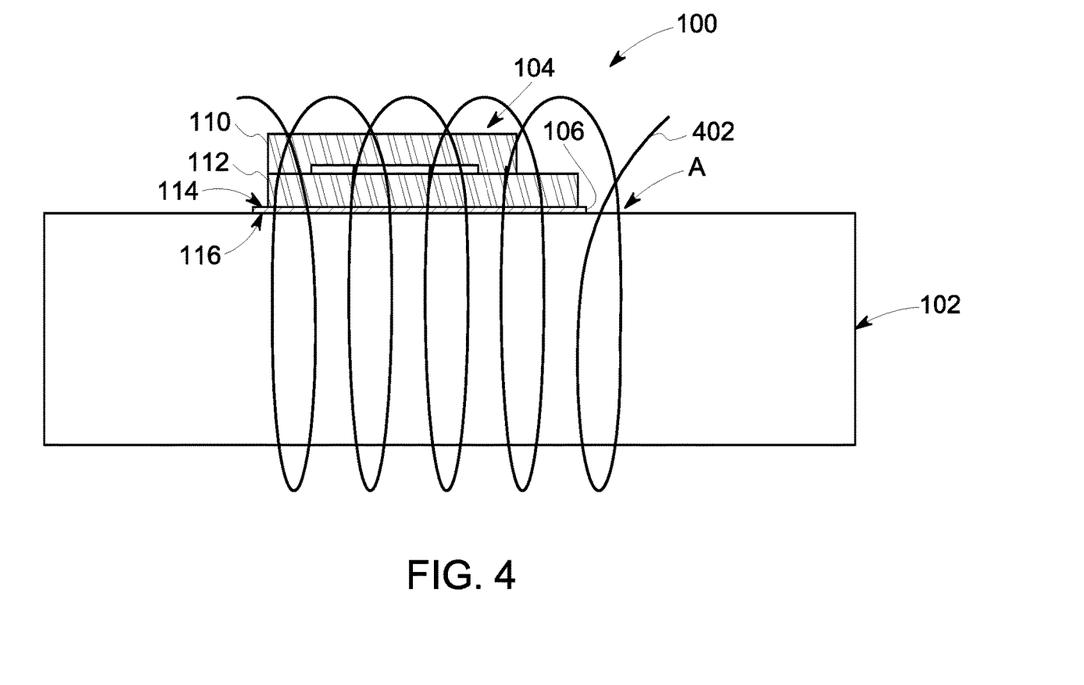
FIG. 4 illustrates a cross-sectional view of a system in accordance with one embodiment.

In one embodiment illustrated in FIG. 4, the sensor 104 is operably coupled with the structure 102 via the metallic joint 106 by an induction coil 402 that applies electrical stimuli to the metallic joint 106. For example, the sensor 104 may be held in a position (e.g., by a fixture, by an operator, or the like) and the induction coil 402 may be placed in contact with, close by to, around, or the like, the sensor 104 and the substrate 102 to which the sensor 104 is to be bonded. In one embodiment, the induction coil 402 may be wrapped around the system 100, as illustrated in FIG. 4. Additionally or alternatively, the induction coil 402 may be wrapped around the sensor 104 such that the induction coil 402 is substantially parallel to the substrate 102. Additionally or alternatively, the induction coil 402 may be placed in contact with the system 100 by an alternative configuration. The induction coil 402 applies localized electrical stimuli to the metallic joint 106 to activate reflow the metallic joint 106 in order to operably couple the sensor 104 with the structure 102. In other embodiments different techniques can be utilized to activate the reflow of the metallic joint 106 for coupling the sensor 104 with the structure 102, such as microwave and/or laser-assisted solder reflow.

Figure 5:
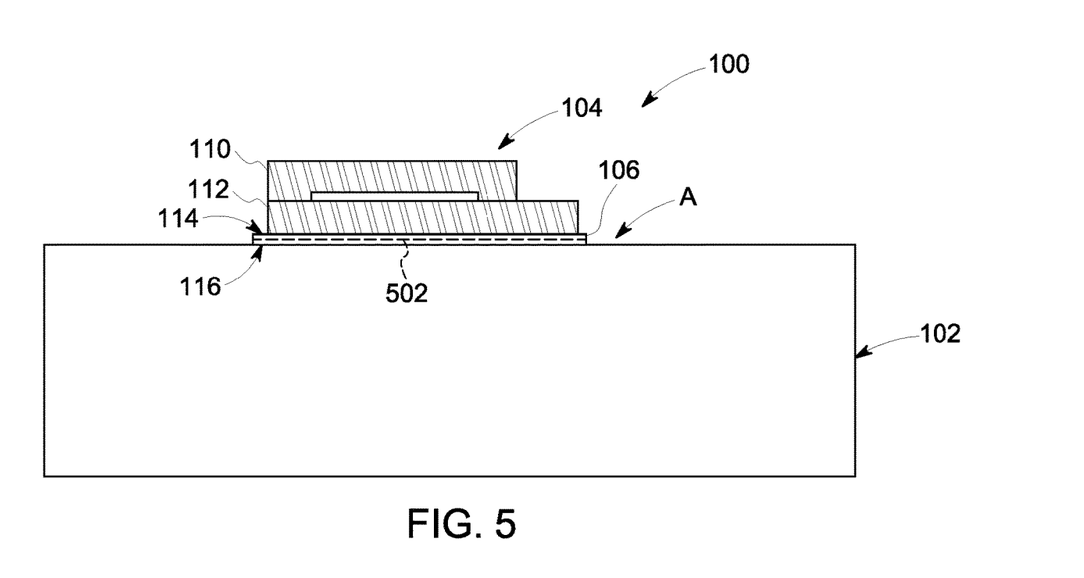
FIG. 5 illustrates a cross-sectional view of a system in accordance with one embodiment.

In one embodiment illustrated in FIG. 5, the sensor 104 is operably coupled with the structure 102 via the metallic joint 106 by an active reflow process at the metallic joint 106. For example, an exothermic metallic film such as a Reactive Nano Technologies (RNT) film 502, or an alternative material, may be placed within the metallic joint 106 in order to locally reflow the metallic joint 106. The sensor 104 may be held in a position (e.g., by a fixture, by an operator, or the like). Electrical stimuli that is applied to the film 502 by a fixture, an electrical source, or the like, activates reflow of the metallic joint 106 in order to operably couple the sensor 104 with the structure 102.

Returning to FIG. 3, at 308, the sensor 104 senses data of the structure 102 through the structure bonding layer 202, the metallic joint 106, and the sensor bonding layer 204. For example, the sensor 104 may sense (e.g., collect, read, measure, obtain, or the like) data of the structure 102. The sensed data of the structure 102 transfers from the structure 102, through the metallic joint 106, through the metallic structure bonding layer and sensor bonding layer, to the sensor 104. For example, as the modulus of elasticity of the metallic sensor bonding layer 204 and the structure bonding layer 202 increases, the transfer of the sensed strain data of the structure 102 improves relative to a non-metallic sensor bonding layer 204 and non-metallic structure bonding layer 202. The data of the structure 102 may include temperature, pressure, stress, strain, or the like. Optionally, the data of the structure 102 may include sensed data of a fluid that is being contained inside of the structure 102. Optionally, the data of the structure 102 may include sensed data of an externality characteristic to which the structure 102 is exposed (e.g., environmental ambient temperature, ambient pressure, ambient humidity, or the like). Optionally, the sensed data of the structure 102 may include any alternative data that is sensed (e.g., collected, measured, read, obtained, or the like) by the sensor 104.

Figure 6:
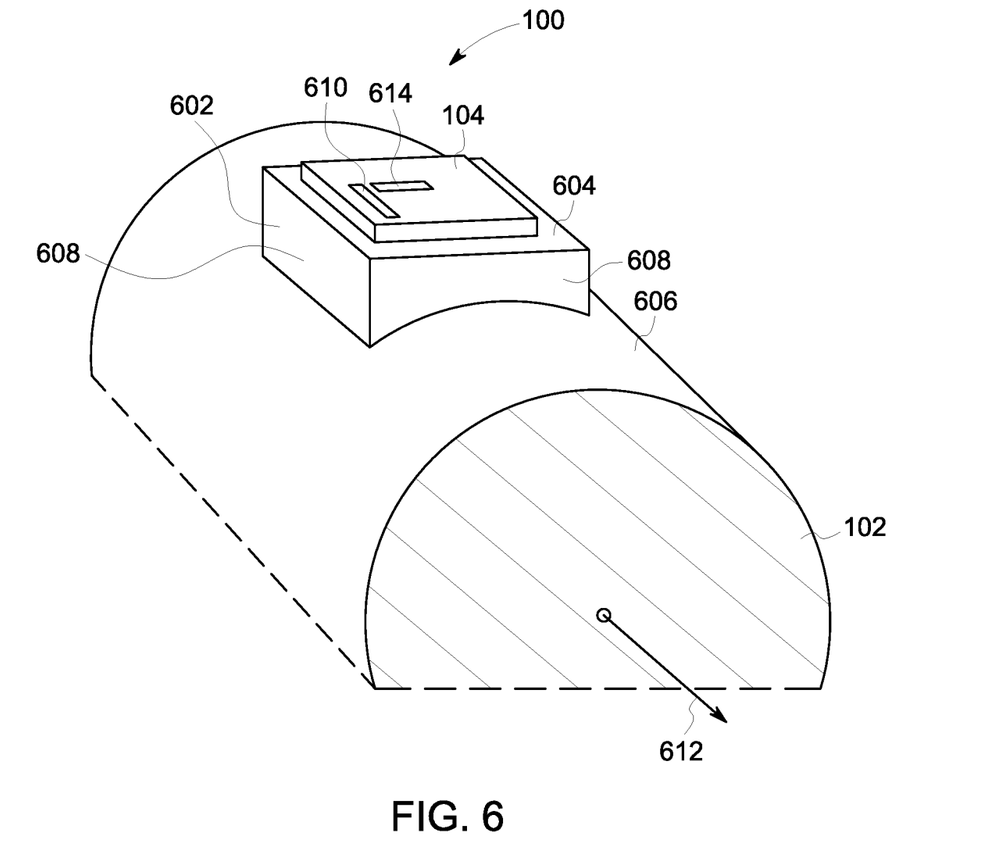
FIG. 6 illustrates a perspective view of the system in accordance with another embodiment of the present disclosure.

FIG. 6 illustrates a perspective view of the system 100 according to another embodiment of the present disclosure. In the illustrated embodiment, the sensor 104 is coupled to the structure 102 via an inlay 602 on the structure 102. The inlay 602 has an outer surface 604 that is planar. The outer surface 604 is a top surface in the illustrated orientation. The sensor 104 is coupled or mounted to the planar outer surface 604. Optionally, the surface 606 of the structure 102 surrounding the inlay 602 is curved (e.g., not planar). For example, the structure 102 can be a cylindrical shaft, and the surface 606 represents the curved outer surface of the shaft. In another example, the structure 102 can be a rotor blade, and the surface 606 represents a curved outer surface of the rotor blade. The planar outer surface 604 of the inlay 602 may provide a better surface for adhesion of the sensor 104 to the structure 102 than the curved surface 606 of the structure 102.

In the illustrated embodiment, the inlay 602 projects beyond the curved surface 606 of the structure 102. The planar outer surface 604 of the inlay 602 is offset from the curved surface 606 surrounding the inlay 602. The inlay 602 includes side walls 608 that each project from the curved surface 606 of the structure 102 to the planar outer surface 604 of the inlay 602. The inlay 602 in the illustrated embodiment represents a pedestal or platform.

Although the structure 102 is curved in the illustrated embodiment, the surface 606 of the structure 102 may be flat and planar in another embodiment. For example, the structure 102 can be a planar bar, beam, and/or the like.

Figure 7:
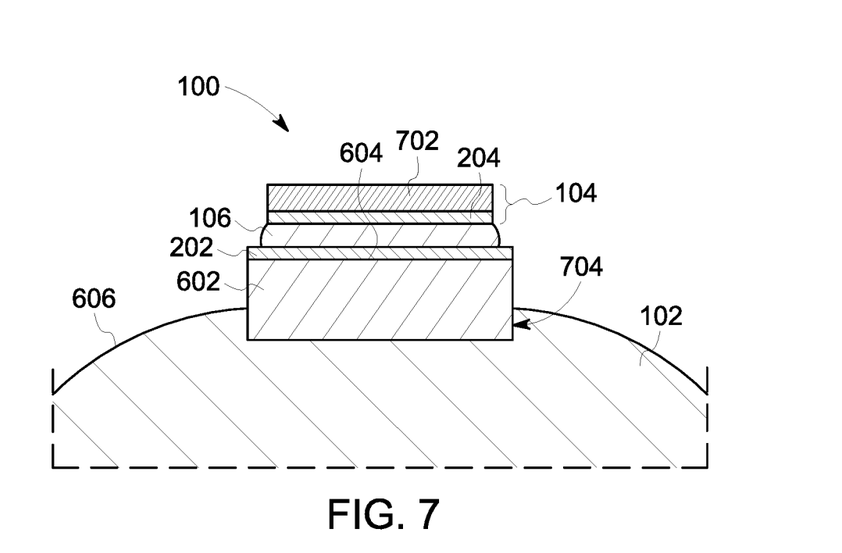
FIG. 7 is an enlarged cross-sectional view of the system shown in FIG. 6.

FIG. 7 is an enlarged cross-sectional view of the system 100 shown in FIG. 6. The sensor bonding layer 204 is disposed on a surface of a non-metallic wafer 702 of the sensor 104. The sensor 104 includes at least one non-metallic wafer 702. In one or more embodiments, the sensor 104 is a SAW device that is configured to sense one or more of temperature data, strain data, or stress data of the structure 102. For example, referring back to FIG. 6, the sensor 104 may include a first sensing element 610 that is elongated parallel to a longitudinal axis 612 of the structure 102 and a second sensing element 614 that is elongated perpendicular to the first sensing element 610. The first sensing element 610 may be configured to measure forces through the structure 102 along the longitudinal axis 612, and the second sensing element 614 may measure forces through the structure 102 perpendicular to the longitudinal axis 612. The one or more non-metallic wafers 702 may be a single crystal quartz wafers that have piezoelectric properties. The SAW device may be capped or sealed inside of a discrete package. Optionally, the SAW device may be hermetically sealed.

The sensor bonding layer 204 is a metallic alloy that is disposed on (e.g., bonded to) a surface of the non-metallic wafer 702. The sensor bonding layer 204 can include or represent the materials of the sensor bonding layer 204 described above with reference to FIG. 2. The structure bonding layer 202 is a metallic alloy is disposed on (e.g., bonded to) the outer surface 604 of the inlay 602, which is planar in the illustrated embodiment. The structure bonding layer 202 can include or represent the materials of the structure bonding layer 202 described above with reference to FIG. 2. The sensor bonding layer 204 is coupled to the structure bonding layer 202 via the metallic joint 106. The metallic joint 106 can include a solder alloy as described above with reference to FIG. 2. The metallic joint 106 bonds to the sensor bonding layer 204 and the structure bonding layer 202 to permanently affix the sensor 104 to the inlay 602 of the structure 102.

The inlay 602 in an embodiment is a different material than the material of the structure 102 surrounding the inlay 602. For example, the inlay 602 may include copper and the structure 102 may lack copper or may include less copper by weight than the inlay 602. Some non-limiting examples of suitable metals for the inlay 602 include copper, nickel, and platinum. These metals can be used individually as the inlay 602 or combined with each other and/or other metals to provide an alloy with application-specific properties, such as stress resistance, solderability, and corrosion resistance. The inlay 602 in a non-limiting example is copper or a copper alloy that includes more than 50% copper by weight. The structure bonding layer 202 can be tin or a tin alloy that is applied onto the copper inlay 602. The structure 102 could be steel, aluminum, or the like. In an alternative embodiment, the inlay 602 has the same material composition as the structure 102 surrounding the inlay 602. For example, the inlay 602 may be formed by milling the structure 102 to remove material of the structure 102, thereby forming the inlay 602 as an integral projection of the structure 102.

The inlay 602 is formed by depositing inlay material onto the structure 102. For example, the inlay 602 can be formed in-situ on the structure 102 via additive manufacturing, casting, or the like. Alternatively, the inlay 602 may be formed separate from the structure 102 and subsequently bonded or otherwise mounted on the structure 102. For example, the inlay 602 can be machined into a designated size and shape remote from the structure 102, and subsequently brazed onto the structure 102 at a braze joint. In an embodiment, the structure 102 defines a recess 704 along the surface 606. The inlay 602 is deposited into the recess 704. The inlay 602 may fill the recess 704 and project out of the recess 704 beyond the surface 606 of the structure 102. For example, the inlay 602 may have a height or thickness greater than the depth of the recess 704 such that the inlay 602 defines a pedestal projecting out of the recess 704. Alternatively, the structure 102 does not define the recess 704, and the inlay 602 is deposited directly onto the surface 606 of the structure 102.

In an embodiment, the inlay 602 can be designed to focus the strain transfer from the structure 102 to the sensor device 104 or to diffuse the high strain fields to the sensor device 104 to protect the sensor 104 from cracking. The desired strain transfer and/or diffusion characteristics can be achieved by selecting the material properties of the inlay 602 and/or the geometric properties of the inlay 602. The material of the inlay 602 can be selected based on the modulus property of the material. In a non-limiting example, the material of the inlay 602 can include or represent a metal foam. Some metal foams have a substantially low modulus of elasticity. The modulus of elasticity of the metal foam (e.g., 100 MpA or less) may even be lower than the organic adhesive typically employed (e.g., at least 500 MpA). Utilizing the metal foam in the inlay 602 can reduce surface strain to allow use of sensor in high strain environments without damaging the sensor. The physical shape, thickness (e.g., height), and/or outer surface size and/or shape of the inlay 602 can also affect the strain transfer.

The embodiment shown in FIGS. 6 and 7 can be formed using the method 300 described with reference to FIG. 3. For example, prior to disposing the structure bonding layer on the structure at 302, the method 300 can include depositing an inlay on the structure. The inlay can be copper and/or another metal. Then, the method 300 can include grinding the inlay such that an outer surface of the inlay is planar. After forming a planar outer surface on the inlay, the method 300 proceeds to 302 and the structure bonding layer is applied to the planar outer surface of the inlay. The structure bonding layer can include tin and/or another metal. The use of the inlay can enable the system to be used on non-planar structures, such as cylindrical shafts, curved rotor blades, and the like, without compromising adhesion quality or sensing accuracy.

In one embodiment of the subject matter described herein, a system includes a structure bonding layer and a sensor. The structure bonding layer is disposed on a structure. The structure bonding layer is a metallic alloy. The sensor includes a non-metallic wafer and a sensor bonding layer disposed on a surface of the non-metallic wafer. The sensor bonding layer is a metallic alloy. The sensor bonding layer is coupled to the structure bonding layer via a metallic joint, and the sensor is configured to sense data of the structure through the metallic joint, the structure bonding layer, and the sensor bonding layer.

Optionally, the non-metallic wafer is single crystal quartz. Optionally, the structure bonding layer is one of electrolytic nickel gold or electroless nickel immersion gold (eNIG). Optionally, the sensor is a surface acoustic wave (SAW) device, and the data of the structure that is sensed by the sensor includes temperature data, stress data, and/or strain data.

Optionally, the system also includes an inlay on the structure, and the structure bonding layer is disposed on an outer surface of the inlay. The inlay is a different material than a material of the structure surrounding the inlay. Optionally, the outer surface of the inlay is planar, and a surface of the structure surrounding the inlay is curved. Optionally, the inlay is disposed in a recess defined within a surface of the structure. Optionally, the inlay projects beyond a surface of the structure surrounding the inlay such that the outer surface of the inlay is offset relative to the surface of the structure. Optionally, the inlay includes copper. Optionally, the structure bonding layer includes tin.

In an embodiment, a method includes disposing a structure bonding layer on a structure. The structure bonding layer is a metallic alloy. The method includes disposing a sensor bonding layer on a surface of a non-metallic wafer of a sensor. The sensor bonding layer is a metallic alloy. The method also includes coupling the structure bonding layer to the sensor bonding layer via a metallic joint. The sensor is configured to sense data of the structure through the metallic joint, the structure bonding layer, and the sensor bonding layer.

Optionally, the method further includes depositing an inlay on the structure. The inlay is a different material than a material of the structure surrounding the inlay, and the structure bonding layer is disposed on an outer surface of the inlay. Optionally, the method further includes grinding the inlay such that the outer surface of the inlay is planar prior to disposing the structure bonding layer on the outer surface. Optionally, the inlay includes copper, and the structure bonding layer includes tin. Optionally, the inlay is disposed in a recess defined within a surface of the structure. Optionally, the inlay is deposited to project beyond a surface of the structure surrounding the inlay such that the outer surface of the inlay is offset relative to the surface of the structure.

A system includes a sensor, an inlay, and a structure bonding layer. The sensor includes a sensor bonding layer disposed on a surface of the sensor. The sensor bonding layer is a metallic alloy. The inlay is disposed on a curved surface of a structure. The inlay includes a planar outer surface. The structure bonding layer is disposed on the planar outer surface of the inlay. The structure bonding layer is a metallic alloy. The sensor bonding layer is coupled to the structure bonding layer via a metallic joint, and the sensor is configured to sense data of the structure through the metallic joint, the structure bonding layer, and the sensor bonding layer.

Optionally, the inlay projects beyond the curved surface of the structure surrounding the inlay such that the outer surface of the inlay is offset relative to the curved surface of the structure. Optionally, the inlay is a different material than a material of the structure surrounding the inlay. Optionally, the inlay includes a metal foam. Optionally, the sensor is a surface acoustic wave (SAW) device that includes a single crystal quartz wafer, and the surface of the sensor on which the sensor bonding layer is deposited is a surface of the single crystal quartz wafer.

In one embodiment of the subject matter described herein, a system includes a structure configured to have a structure bonding layer disposed on a surface of the structure. The structure bonding layer is a metallic alloy. The system includes a sensor configured to have a sensor bonding layer disposed on a surface of the sensor. The sensor bonding layer is a metallic alloy. The sensor bonding layer is configured to be coupled to the structure bonding layer via a metallic joint in order for the sensor to sense data of the structure through the metallic joint, the structure bonding layer, and the sensor bonding layer.

Optionally, the sensor bonding layer is configured to be coupled to the structure bonding layer via the metallic joint at a location outside of a reflow oven. Optionally, the data of the structure includes one or more of temperature data, stress data, or strain data. Optionally, the structure is one or more of a shaft, a rod, or a blade. Optionally, the sensor is configured to self-align with the structure via the metallic joint. Optionally, the structure bonding layer is configured to be disposed on an outer surface of the structure.

Optionally, the system includes an induction coil configured to be in operational contact with the metallic joint. The induction coil is configured to apply electrical stimuli to the metallic joint.

Optionally, the sensor is a surface acoustic wave (SAW) device. Optionally, the SAW device comprises one or more of a strain gauge, a torque sensor, or a temperature sensor.

In one embodiment of the subject matter described herein, a method includes disposing a structure bonding layer on a surface of a structure. The structure bonding layer is a metallic alloy. The method includes disposing a sensor bonding layer on a surface of a sensor. The sensor bonding layer is a metallic alloy. The structure bonding layer is coupled to the sensor bonding layer via a metallic joint in order for the sensor to sense data of the structure through the metallic joint, the structure bonding layer, and the sensor bonding layer.

Optionally, coupling the sensor bonding layer to the structure bonding layer via the metallic joint occurs at a location that is outside of a reflow oven. Optionally, the data of the structure includes one or more of temperature data, stress data, or strain data.

Optionally, the structure is one or more of a shaft, a rod, or a blade. Optionally, the sensor is configured to self-align with the structure via the metallic joint. Optionally, the structure bonding layer is configured to be disposed on an outer surface of the structure.

Optionally, the method includes applying electrical stimuli to the metallic joint with an induction coil configured to be in operation contact with the metallic joint. Optionally, the sensor is a surface acoustic wave (SAW) device. Optionally, the SAW device comprises one or more of a strain gauge, a torque sensor, or a temperature sensor.

In one embodiment of the subject matter described herein, a system includes a structure configured to have a structure bonding layer disposed on a surface of the structure. The structure bonding layer is a metallic alloy. The system includes a sensor configured to have a sensor bonding layer disposed on a surface of the sensor. The sensor bonding layer is a metallic alloy. The sensor bonding layer is configured to be coupled to the structure bonding layer via a metallic joint at a location outside of a reflow oven in order for the sensor to sense data of the structure through the metallic joint, the structure bonding layer, and the sensor bonding layer. Optionally, the sensor is a surface acoustic wave (SAW) device.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a structure bonding layer disposed on a structure, wherein the structure bonding layer is a metallic alloy;
a sensor including a non-metallic wafer and a sensor bonding layer disposed on a surface of the non-metallic wafer, wherein the sensor bonding layer is a metallic alloy;
a metallic joint coupling the sensor bonding layer to the structure bonding layer; and
an induction coil operably coupling the sensor to the metallic joint, the induction coil applying an electrical stimuli to the metallic joint,
wherein the sensor is operably coupled with the structure and configured to sense data of the structure through the metallic joint, the structure bonding layer, and the sensor bonding layer.

2. The system of claim 1, wherein the induction coil is wrapped around the sensor.

3. The system of claim 2, wherein a longitudinal axis of the induction coil extends parallel to the substrate.

4. The system of claim 1, wherein the induction coil is wrapped around the sensor and the substrate.

5. The system of claim 1, wherein the induction coil applies localized electrical stimuli to the metallic joint to activate reflow of the metallic joint to operably couple the sensor to the structure.

6. The system of claim 1, wherein the non-metallic wafer is single crystal quartz.

7. The system of claim 1, further comprising an inlay on the structure and the structure bonding layer is disposed on an outer surface of the inlay, wherein the inlay is a different material than a material of the structure surrounding the inlay.

8. The system of claim 7, wherein the outer surface of the inlay is planar and a surface of the structure surrounding the inlay is curved.

9. The system of claim 7, wherein the inlay is disposed in a recess defined within a surface of the structure.

10. The system of claim 7, wherein the inlay projects beyond a surface of the structure surrounding the inlay such that the outer surface of the inlay is offset relative to the surface of the structure.

11. A method comprising:
disposing a structure bonding layer on a structure, wherein the structure bonding layer is a metallic alloy;
disposing a sensor bonding layer on a surface of a non-metallic wafer of a sensor, wherein the sensor bonding layer is a metallic alloy;
coupling the structure bonding layer to the sensor bonding layer via a metallic joint;
operably coupling, by an induction coil, the sensor to the metallic joint; and
applying an electrical stimuli, by the induction coil, to the metallic joint,
wherein the sensor is configured to sense data of the structure through the metallic joint, the structure bonding layer, and the sensor bonding layer.

12. The method of claim 11, further comprising wrapping the induction coil around the sensor and the substrate.

13. The method of claim 11, wherein the induction coil applies localized electrical stimuli to the metallic joint to activate reflow of the metallic joint to operably couple the sensor to the structure.

14. The method of claim 11, further comprising depositing an inlay on the structure, wherein the inlay is a different material than a material of the structure surrounding the inlay and the structure bonding layer is disposed on an outer surface of the inlay.

15. The method of claim 14, wherein the inlay is disposed in a recess defined within a surface of the structure, wherein the inlay is deposited to project beyond a surface of the structure surrounding the inlay such that the outer surface of the inlay is offset relative to the surface of the structure.

16. A system comprising:
an inlay disposed on a curved surface of a structure, the inlay including a planar outer surface;
a structure bonding layer disposed on the planar outer surface of the inlay, wherein the structure bonding layer is a metallic alloy; and
a sensor including a sensor bonding layer disposed on a surface of the sensor, wherein the sensor bonding layer is a metallic alloy, the sensor including a first sensing element elongated in a direction parallel to a longitudinal axis of the structure and a second sensing element elongated in a direction perpendicular to the longitudinal axis of the structure,
wherein the sensor bonding layer is coupled to the structure bonding layer via a metallic joint, and the sensor is configured to sense data of the structure through the metallic joint, the structure bonding layer, and the sensor bonding layer.

17. The system of claim 16, wherein the first sensing element is configured to measure forces through the structure along the longitudinal axis of the structure.

18. The system of claim 16, wherein the second sensing element is configured to measure forces through the structure perpendicular to the longitudinal axis of the structure.

19. The system of claim 16, wherein the first sensing element and the second sensing element are spaced apart from one another and provided on a surface of the sensor opposite the inlay.

20. The system of claim 16, wherein the inlay projects beyond the curved surface of the structure surrounding the inlay such that an outer surface of the inlay is offset relative to the curved surface of the structure, wherein the inlay includes a metal foam.

\* \* \* \* \*